United States Patent [19]
Saito

[11] 3,823,269
[45] July 9, 1974

[54] SPEECH PATH TEST SYSTEM FOR TIME-DIVISION SWITCHING EQUIPMENT

[75] Inventor: Noriaki Saito, Tokyo, Japan

[73] Assignee: Nippon Electric Company, Limited, Tokyo, Japan

[22] Filed: July 27, 1972

[21] Appl. No.: 275,667

[30] Foreign Application Priority Data

Aug. 11, 1971 Japan .......... 46-60236

[52] U.S. Cl. .......... 179/15 BF
[51] Int. Cl. .......... H04j 3/14
[58] Field of Search ...... 179/15 BF, 175.3, 175.2 R, 179/175.2 C, 2 A

[56] References Cited

UNITED STATES PATENTS

| | | | |
|---|---|---|---|
| 3,371,165 | 2/1968 | Earle | 179/15 BF |
| 3,508,018 | 4/1970 | Orne | 179/175.3 |
| 3,564,143 | 2/1971 | Stewart | 179/2 A |
| 3,683,115 | 8/1972 | Schellenberg | 179/15 BF |

*Primary Examiner*—Kathleen H. Claffy
*Assistant Examiner*—David L. Stewart
*Attorney, Agent, or Firm*—Sughrue, Rothwell, Mion, Zinn & Macpeak

[57] ABSTRACT

A system and method of testing a signal path in a time division switching system. In a switching system of this type the calling subscriber has one time slot assigned for communication with the called subscriber, and the called subscriber has a time slot for communication with the calling subscriber. The time slots are not necessarily in the same position relative to a frame of time slots. The calling and called subscribers are connected in a conventional manner via highway switching networks and a channel shifting network under control of a control circuit. A test of the circuit connection is made after the called subscriber is set-up for receiving the call but before the off-hook status of the called subscriber occurs. When the highway switch networks and the channel shifting networks are set-up by the control circuit to provide the connection path to the called subscriber, and while the called subscriber is in the on-hook condition, a gate is opened to connect the signals appearing on the incoming line for the called subscriber to the outgoing line for the called subscriber. A binary test signal is sent via the channel shifting circuit and the highway switching network to the incoming line of the called subscriber. The signal passes through the opened gate and then through the highway switching network and the channel shifting circuit back to the test circuit. If the connection path has been set-up correctly, the test signal received by the test circuit will be the same as the test signal transmitted by the test circuit.

2 Claims, 7 Drawing Figures

SPEECH PATH TEST SYSTEM FOR TIME-DIVISION SWITCHING EQUIPMENT

This invention relates to a speech path test system for use in time-division switching equipment.

It has been the common practice in a space-division switching system to test whether or not a speech path has been actually established. This is needed for the security of connections.

In the conventional switching equipment, two lines A and B serving as speech paths are connected to a marker to permit a continuity test. However, it is difficult to apply such a speech path test system to the time-division switching equipment as it is. In other words, in a time-division switching equipment, a first time slot assigned to a calling subscriber telephone and a second time slot assigned to a called subscriber telephone on the test side are different in position. Therefore, the test of a speech path cannot be achieved by sending out a DC or an AC test signal after the speech path has been established.

The principal object of this invention is therefore to provide such a novel and improved speech path test system for use in time-division switching equipment as is adapted to monitor and test the speech path established in the equipment.

According to this invention, the speech path test can be conducted by sending from a test circuit a binary code composed of a suitable number of bits to a subscriber's line as a test signal and by comparing in the test circuit the binary code with a binary code pattern sent back from the subscriber's line.

Stated more specifically, whether or not a speech path has been properly established can be tested by the present test system as described hereunder.

The subscriber's line incorporates a gate means for sending back a part or all of information received from a switching network to the switching network during the on-hook period of the subscriber's telephone and for sending out speech information of the subscriber to the switching network during the off-hook period of the subscriber's telephone. During the on-hook period, a test signal delivered from the test circuit is turned back at the line circuit so that the sent back code pattern and the initial code delivered from the test circuit may be compared in the test circuit.

Now the principle of this invention will become apparent from a consideration of the following detailed description when read in conjunction with the accompanying drawings, wherein.

Figure 1:
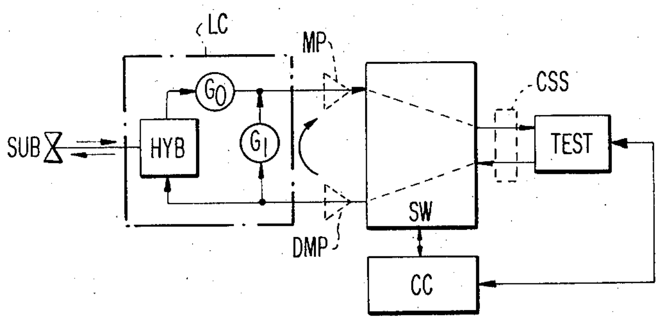
FIG. 1 is a block diagram illustrating the principle of operation of the speech path test system according to this invention.

Referring to FIG. 1, which schematically shows the principle of the invention, a test circuit arrangement of the invention is composed of a switching network SW; a central controller CC; a test circuit TEST; a circuit HYB for the two wire — four wire conversion, encoding, decoding, and for the detection of the on-hook or off-hook state of a subscriber's telephone; gate circuits, $G_0$ and $G_1$, and the subcriber's telephone SUB.

It will be understood that $G_0$ is closed and $G_1$ is opened during the on-hook period, which the former is opened and the latter is closed during the off-hook period, by the controlling operation of the on-hook and off-hook detection circuit incorporated in the circuit HYB. The test is carried out during the on-hook period by transmitting the binary test pattern from the test circuit TEST to the subscriber's telephone through the switching network SW.

If the subscriber's telephone is in the on-hook state with the switching network SW in the normal operating condition, the binary test pattern is sent back through gate $G_1$ to the test circuit TEST.

If the result of the comparison of the sent-back pattern with the original pattern is found abnormal, it is conveyed to the central controller CC, which then initiates a trouble processing action.

During the off-hook period of the subscriber's telephone, $G_0$ is open and $G_1$ is closed, with the result that speech information from the subscriber's telephone is delivered to the switching network SW via the gate $G_0$.

Figure 2:
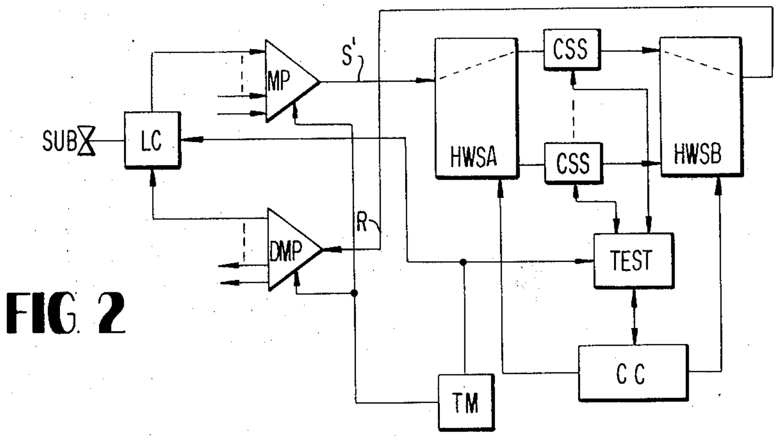
FIG. 2 is a block diagram of a speech path test system according to this invention.

Referring to FIG. 2, which shows the present system in more detail, the speech path test system of this invention has a subscriber line circuit LC, a multiplexing circuit MP, a demultiplexing circuit DMP, highway switching network HWSA and HWSB, a channel shifting circuit CSS, a speech path test circuit TEST, a central controller CC, and a timing pulse source TM.

A subscriber's message encoded by the subscriber circuit LC is then multiplexed by the multiplexer MP before being applied to the highway switching network HWSA.

At the network HWSA, a connection is established between the channel shifting circuit CSS and a line S according to a command sent from the central controller CC. In the channel shifting circuit CSS, a timedomain matching is taken between the two time slots which have been assigned by the multiplexing circuit MP to the above-mentioned subscriber's telephone and another subscriber's telephone (not shown) to be connected with the first-mentioned one.

The output of the channel shifting circuit CSS is applied to the highway switching network HWSB, which serves to establish a connection between the CSS and the line R according to a command from the central CC.

The time-division multiplexed information on the line R is then demultiplexed by the demultiplexing circuit DMP before applied to the line circuit LC. Information thus applied to the circuit LC is that one from the above-mentioned subscriber's telephone not shown, which has been given by the time-division switching by means of the HWSA and the CSS.

The speech path formed for the period of the telephone conversation in progress between the two subscribers is an mentioned previously. In the course of the speech path test, the test pattern given from the test circuit TEST is applied to the channel shifting circuit CSS and received by the circuit TEST via the route: TEST — CSS — HWSB — DMP — LC — MP — HWSA — CSS — TEST.

By comparing the binary test pattern transmitted from the test circuit with the received pattern, the test circuit can test whether or not the individual components CSS, HWSA, HWSB, DMP, and MP are in normal operation. The test result is transferred to the central controller so that it determines whether the connection should be progressed or the trouble processing should be started.

Figure 3:
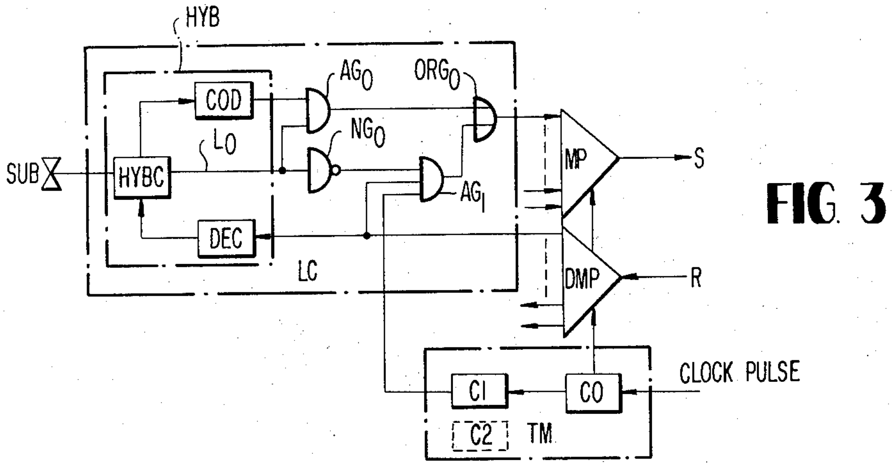
FIG. 3 is a detailed block diagram of the line circuit shown in FIG. 2.

Referring to FIG. 3, which shows a detailed block diagram of the line circuit LC in FIG. 2, it will be understood that the circuit HYB in FIG. 1 is composed of a subscriber DC loop detection circuit, a two wire — four wire conversion hybrid coil HYBC, a coder COD, and a decoder DEC.

During the off-hook period, or at the moment a DC loop is formed, a binary digit 1 appears at the line $L_0$, whereas during the onhook period a binary digit 0 appears at the line $L_0$. The coder COD and the decoder DEC can be, for example, a delta modulation coder and a delta modulation decoder, respectively. $AG_0$ and $AG_1$ denote "AND" gates; $ORG_0$, an "OR" gate; $NG_0$, a "NAND" gate; $C_0$, a 24'ary counter for time-slot assignment; and $C_1$, a quaternary counter for designating the point of the insertion of the binary test pattern.

Figure 5A:
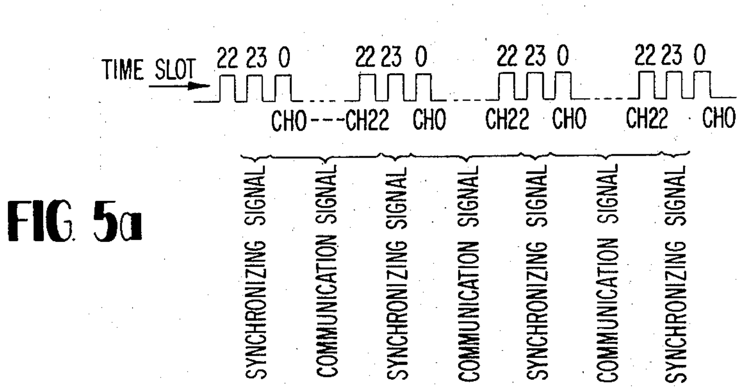
FIGS. 5a–5c illustrate the relationship between the time slots of the time division switching network and the time during which the test-of-the-signal path is carried out.
Figure 5B:
Figure 5C:
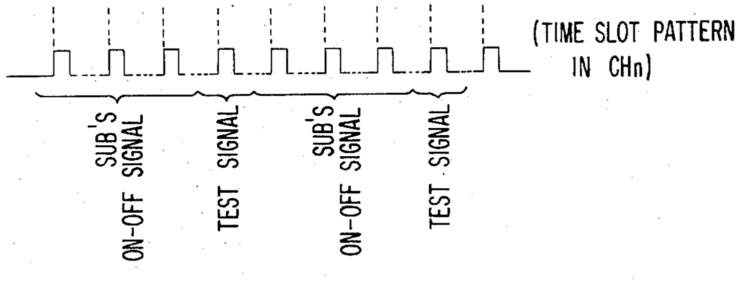

The multiplexing circuit MP performs the time-division multiplexing of the information from twenty-three different subscriber channels. A time slot pattern viewed at the line S is as shown at FIG. 5 (*a*). As shown in this drawing, there are time slots assigned to frame synchronization, besides those for information sent from the subscriber's line LC. The information contained in the frame synchronization time slot constitutes a time slot pattern as shown at FIG. 5 (*b*). The information is in synchronism with the operation of the counter $C_1$ and has a synchronizing pulse pattern 1,100 when four frames are taken as a unit.

During the on-hook period, binary digit 0 is delivered to the line $L_0$ from the circuit HYB and the "AND" gate $AG_1$ is opened in synchronism with the synchronous pattern and once every four frames, whereby the binary test pattern incoming through the demultiplexing circuit is sent back to the multiplexing circuit MP via the "OR" gate $ORG_0$.

The time slot pattern corresponding to any one of the information time slots for the on-hook period is as shown in FIG. 5 (*c*).

Time slots for other-than-test use are to indicate either the on-hook or the off-hook state of the subscriber's telephone. In the embodiment shown in FIG. 3, a binary pattern 000 indicates the "on-hook" state and other-than-000 patterns indicate the "off-hook" state. It will be seen that the binary test pattern is sent from the test circuit once every four frames.

Figure 4:
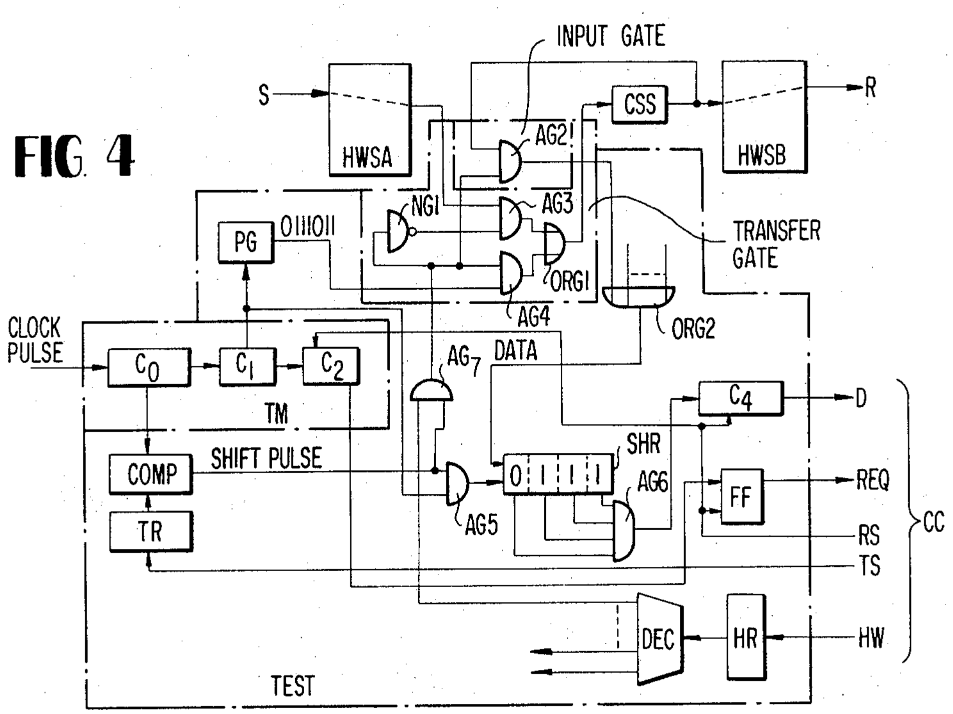
FIG. 4 is a block diagram of the test circuit shown in FIG. 2.

Referring to FIG. 4 which shows a detailed circuit diagram of the test circuit TEST included in the block diagram of FIG. 2, $C_0$ denotes a counter adapted to count up to 24 for time-slot assignment; $C_1$, a quaternary counter; $C_2$, a counter for deciding the speech-path testing time interval; PG, a generator for producing the binary test pattern (0111 according to the embodiment of FIG. 4).

COMP denotes a comparator; TR, a five-bit register for designating a time slot to be assigned to a calling subscriber telephone connected to a subscriber telephone to be tested; $AG_2$ through $AG_4$ denote "AND" gates for connecting a highway to be tested to the test circuit; $NG_1$, a "NAND" gate; $ORG_1$ and $ORG_2$, "OR" gates; $AG_5$, and "AND" gate which opens once every four frames at the time slot designated by the register TR; SHR, a shift register for memorizing a four-bit test signal, bit after bit; $AG_6$, an "AND" gate for the detection of the test signal pattern; $C_4$, a counter for detecting how many times the binary test pattern (0111 in the example of FIG. 4) appeared within the speech path test interval. FF denotes a flip-flop which is brought to the set state on the completion of the speech path test, to demand the central controller CC of the transfer of the test result; HR, a register for designating a highway to be tested; DEC, a decoder; and $AG_1$, and "AND" gates.

While the speech path test is not being conducted, $AG_2$ and $AG_4$ are closed, with $AG_3$ left open. Therefore, the output of the highway switching network HWSA is applied to the channel shifting circuit CSS via the "AND" gate $AG_3$ and the "OR" gate $ORG_1$. In other words, $AG_3$ and $AG_4$ constitute, in combination, a transfer-type gate switch by the use of $NG_1$ and $ORG_1$. Furthermore, $AG_2$ constitutes an input gate for sending back the transmitted binary test pattern to the test circuit.

In conducting the test, information HW for designating a highway to be tested and information TS for the assignment of a time slot are respectively delivered to the registers HR and TR from the central controller. Upon application of this information to the registers, the counters $C_2$ and $C_4$ are reset together with the flip-flop FF.

On the detection of the coincidence between the content in the time-slot assignment counter $C_0$ and that in the register TR, for instance at a time slot $T_0$, the output of the comparator becomes a binary digit 1 and the "AND" gate $AG_5$ is opened once every four frames in cooperation with the counter $C_1$, for instance when the content of the counter $C_1$ is a binary digit "0". Then, the shift register SHR performs the shifting operation to memorize the output of the CSS, which has been connected by the $AG_2$.

Because of the connection between $C_1$ and $AG_5$, the shift pulse from COMP opens $AG_5$ only once every four frames. The shift pulse, which occurs once every frame, opens $AG_7$ each time it occurs provided $AG_7$ is selected by the code entered into register HR. The opening of $AG_7$ in turn opens $AG_4$ and $AG_2$ and closes $AG_3$. The opening of both $AG_4$ and $AG_2$ permits the binary test pattern to travel along the route PG — $AG_4$ — $ORG_1$ — CSS — HWSB — DMP — $AG_1$ — $ORG_0$ — MP — HWSA — $AG_3$ — $ORG_1$ — CSS — $AG_2$ — $ORG_2$ — SHR.

In the type of switching system described the circuit between a calling subscriber and a called subscriber is set-up in a known manner. For example assume subscriber 1 calls subscriber 2 and the time slot arrangement is such that subscriber 1 communicates via time slot $T_0$ and subscriber 2 via time slot $T_1$.

The information from subscriber 1 to subscriber 2 appears in time slot $T_0$ and passes out of the LC associated with subscriber 1 and via MP and HWSA to a CSS which switches the information from time slot $T_0$ to the time slot $T_1$. The information then passes through HWSB and DMP to the LC associated with subscriber 2. The information from subscriber 2 travels in a reverse direction and passes through a CSS which time switches the information in a reverse time sense as compared with the switching in the other CSS.

In accordance with the detailed apparatus described thus far, the circuit of the called subscriber is tested at a specific time by connecting, via gate $AG_1$, the incoming and outgoing highways of the LC associated with the subscriber circuit being tested, and by sending a test signal through CSS (the one connected to transfer information to the called subscriber), HWSB, DMP, LC, MP, HWSA, CSS (the one connected to transfer information away from the called station) and back to the TEST circuit.

Thus, the shift register memorizes the test pattern 0111, which is generated by the pattern generator. The "AND" gate $AG_6$ for monitoring the content stored in the SHR generates binary digit 1 on detection of the binary test pattern and adds digit 1 to the counter $C_4$ every time the test pattern is detected.

When the channel shifting circuit CSS is contained in the route $ORG_1$ — CSS — HWSB which forms a part of the test pattern path, it delivers information contained in a time slot $T_0$, for example, assigned to the calling subscriber's telephone to the highway switching network HWSB at a time slot $T_1$, for example, assigned to the subscriber's telephone to be tested.

When the CSS is contained in the route $ORG_1$ — CSS — $AG_2$ which forms a part of the same route as the one mentioned previously, it delivers information contained in a time slot $T_1$ assigned to the subscriber's telephone to be tested to both $AG_2$ and HWSB at a time slot $T_0$, assigned to the calling subscriber's telephone.

As the counter $C_2$ counts digit 1's in succession and when the content of $C_2$ has reached a prescribed value, it causes the flip-flop to be set to demand the central controller CC of the transfer of the test result and delivery of information for designating a highway and a time slot necessary for the subsequent test.

When set state of the FF is detected, the controller CC initiates operation. After the reception of the contents of the counter $C_4$, the control CC delivers information for designating the previously mentioned highway and time slot. At the same time, the CC causes the counters $C_2$ and $C_4$ to be reset to demand the subsequent test. The output of the counter $C_4$ having a value exceeding a prescribed value, indicates that the test result is normal and permits the controller CC to continue the connection operation. If the test result indicates an abnormal state, the CC initiates trouble processing action.

As has been described, this invention provides a speech path test system for use in a time-division switching system which comprises a plurality of line circuits each incorporating gate means and which is so arranged that during the on-hook period of a subscriber's telephone a part or all of the information received from the switching network is sent back to the highway switch network and during the off-hook period of the subscriber's telephone the subscriber's speech information is transmitted, while signal testing means is provided for turning back, during the on-hook period of the subscriber's telephone the binary test pattern delivered from a test circuit, whereby the testing of the condition of the speech path is achieved.

While the description has been given of an embodiment with the line circuit, the multiplexing circuit, the demultiplexing circuit, and the highway switching network assumed to be incorporated in the same siwtching equipment, it will be understood that the present invention is applicable to a case where they are installed separated at several telephone exchange offices.

Furthermore, as will be apparent to those skilled in the art, the speech path structure described above as taking the form of highway switching network — channel shifting circuit — highway switching network may be of any other form.

What is claimed is:

1. A system for testing the existence of a speech path in a time-division switching system of the type which connects a calling subscriber to a called subscriber via a switching network means which is adapted to transfer signals from said calling subscriber occurring in a first time slot to said called subscriber during a second time slot and to transfer signals from said called subscriber occuring during said second time slot to said calling subscriber during said first time slot, wherein said first and second time slots are not necessarily the same, said system comprising, a. means responsive to said called subscriber being in an on-hook state for providing a connection path between incoming and outgoing signal paths, the latter paths being connected between said switching network and said called subscriber, b. test circuit means for transmitting and receiving a test signal, c. test circuit connection means for connecting said test circuit means to said switching network to cause said test signal to be transmitted via said switching network, said incoming path, said connection path, said outgoing path, and said switching network and be received by said test circuit means when said speech path is properly set up and said called subscriber is in the on-hook state.

2. A system as claimed in claim 1 wherein said switching network includes a first switching path for transferring signals from said calling subscriber to said called subscriber and a second switching path for transferring signals from said called subscriber to said calling subscriber, and wherein said test circuit means comprises, a. first switch means connected between said test circuit means and said first switching path for connecting said test signal to said first switching path only during said first time slot, and b. second switch means connected between said test circuit and said second switching path for connecting a test signal in said second switching path to said test circuit only during said first time slot.

* * * * *

UNITED STATES PATENT OFFICE

CERTIFICATE OF CORRECTION

Patent No. 3,823,269 Dated August 13, 1974

Inventor(s) Noriaki Saito

It is certified that error appears in the above-identified patent and that said Letters Patent are hereby corrected as shown below:

IN THE SPECIFICATION:

Column 2, line 6 -- delete "which" and insert --while -- lines 42-43 delete "timedo-main" and insert -- time-domain -- line 55 -- after "before " insert -- being --

Column 3, line 17-- delete "on hook" and insert -- on-hook --

Column 6, line 7 -- delete "siwtching" and insert -- switching --

Signed and sealed this 10th day of December 1974.

(SEAL)
Attest:

McCOY M. GIBSON JR.
Attesting Officer

C. MARSHALL DANN
Commissioner of Patents